Nov. 27, 1962
R. E. HUNDLEY, JR
3,065,821
HUNTER'S TREE STAND AND SEAT
Filed May 18, 1961
2 Sheets-Sheet 1
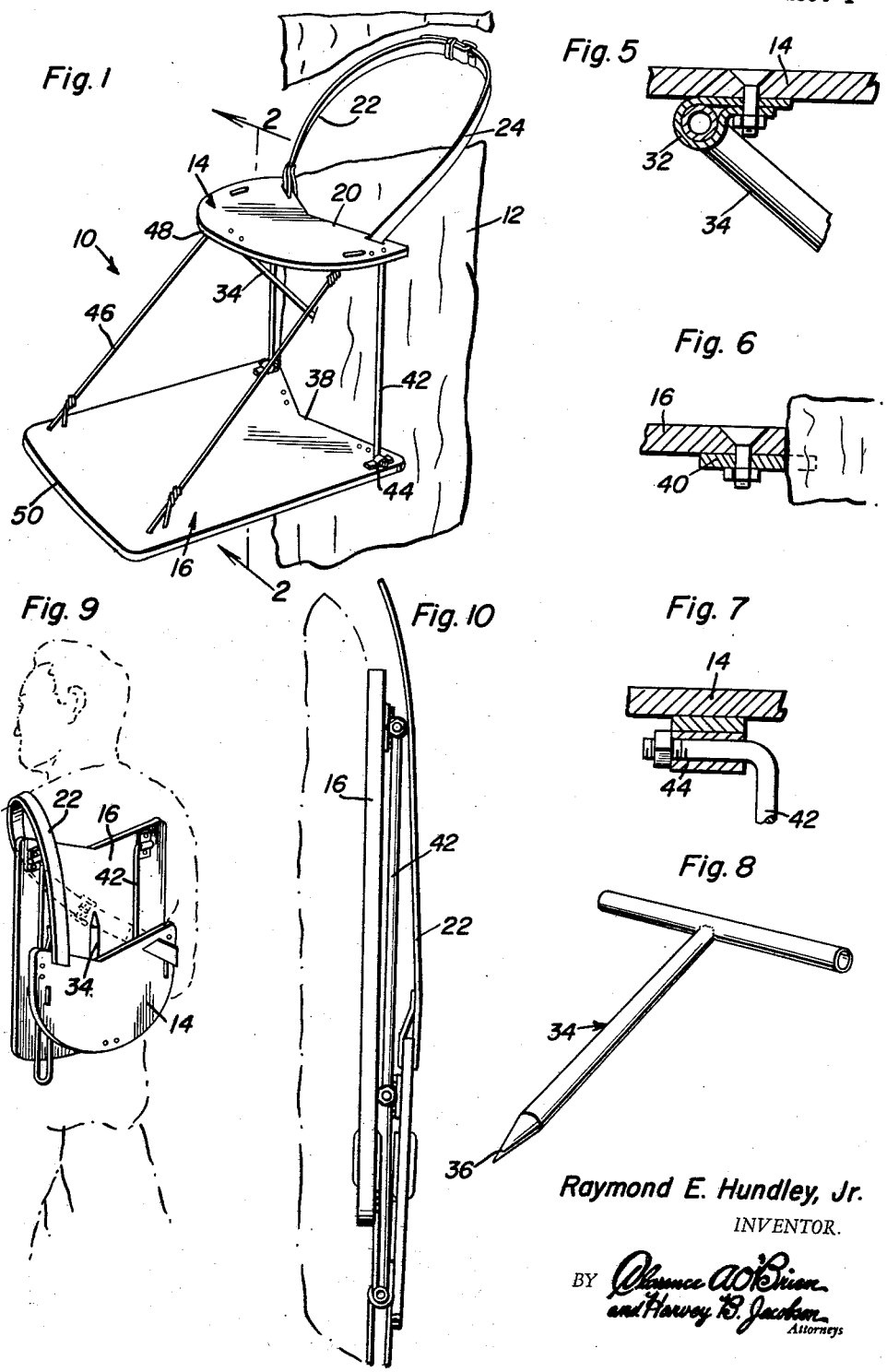
Raymond E. Hundley, Jr.
INVENTOR.

Nov. 27, 1962  R. E. HUNDLEY, JR  3,065,821
HUNTER'S TREE STAND AND SEAT
Filed May 18, 1961  2 Sheets-Sheet 2
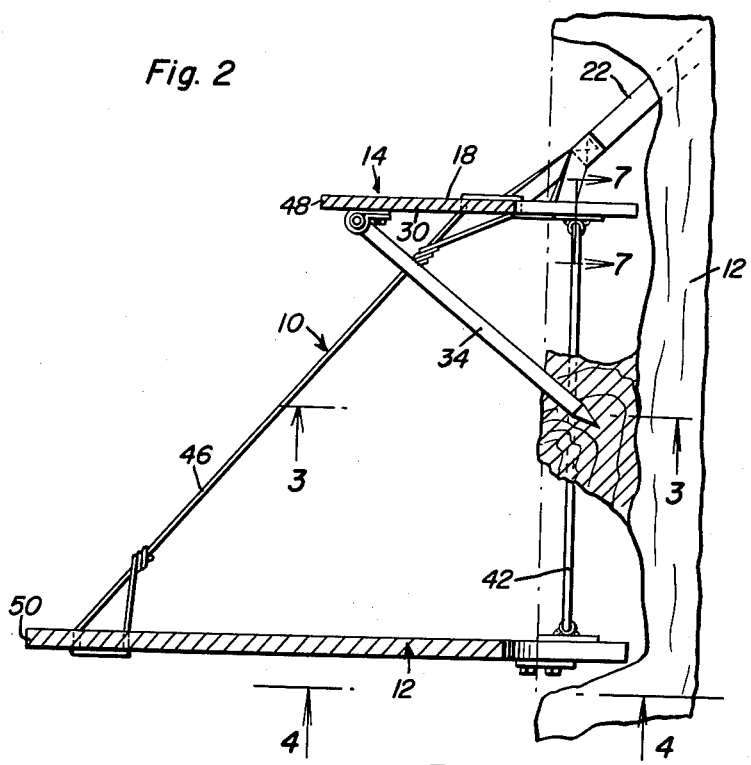
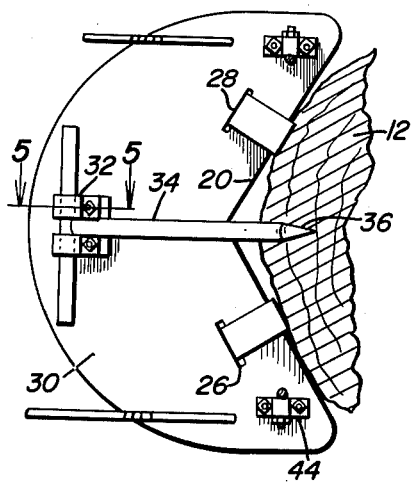
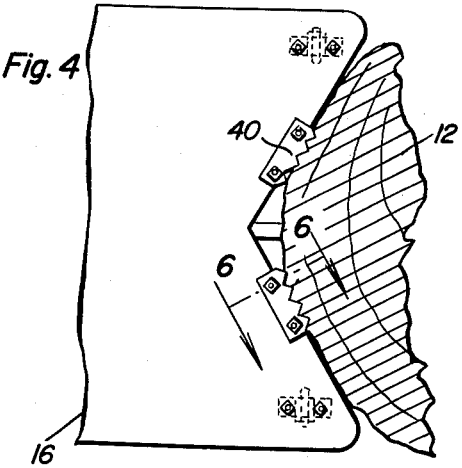
Raymond E. Hundley, Jr.
INVENTOR.

United States Patent Office 3,065,821
Patented Nov. 27, 1962

3,065,821
HUNTER'S TREE STAND AND SEAT
Raymond E. Hundley, Jr., Rte. 1, Eagle Rock, Va.
Filed May 18, 1961, Ser. No. 111,103
3 Claims. (Cl. 182—187)

This invention relates to a collapsible seat and stand assembly for sportsmen.

It is therefore a primary object of the present invention to provide a portable and collapsible seat and stand assembly for sportsmen that may be readily extended and attached to a tree for comfortably supporting a sportsman thereon for better location and observation for game hunting purposes.

Another object of this invention is to provide a portable assembly capable of being strapped to a hunter's back which may be easily mounted on a tree trunk at any desired level providing both a seat and stand for the hunter at properly spaced levels.

In accordance with the foregoing objects, the portable assembly of the present invention includes a seat portion which is pivotally connected by a pair of links to a stand portion and horizontally displaceable with respect to each other from a collapsed position to a position wherein the seat and stand portions are rigidly and vertically spaced with respect to each other when engaged at spaced locations with a supporting tree trunk surface presenting vertically aligned tree engaging edges. The upper seat portion of the assembly when extended has connected thereto a tree embracing strap and a pivotally connected tree engaging brace for positioning the seat portion on the tree trunk. The lower stand portion is supported in its vertical position below the seat portion by connecting means including the pair of connecting links and extended cables. Also, the tree engaging edge of the stand portion is provided with load engaged grippers to further support the tree engaging edge on the tree trunk. The assembly when collapsed or folded, safely holds the tree engaging brace between the seat and stand portions which are then collapsed against each other. The tree embracing strap connected to the seat portion may then be conveniently utilized to secure the collapsed assembly or strap the folded assembly onto the back of the sportsman.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the extended tree stand and seat assembly mounted on a tree trunk.

FIGURE 2 is a partial sectional view of the extended assembly taken through a plane indicated by section line 2—2 in FIGURE 1.

FIGURE 3 is a sectional view taken substantially through a plane indicated by section line 3—3 of FIGURE 2.

FIGURE 4 is a sectional view taken substantially through a plane indicated by section line 4—4 of FIGURE 2.

FIGURE 5 is a partial sectional view taken substantially through a plane indicated by section line 5—5 in FIGURE 3.

FIGURE 6 is a sectional view taken through a plane indicated by section line 6—6 of FIGURE 4.

FIGURE 7 is a sectional view taken substantially through a plane indicated by section line 7—7 in FIGURE 2.

FIGURE 8 is a perspective view of the tree engaging bracing member of the present invention.

FIGURE 9 is a perspective view of the assembly in folded position carried on the back of a hunter.

FIGURE 10 is a side elevational view of the assembly in folded condition.

Referring now to the drawings in detail, FIGURES 1 and 2 illustrate the extended tree stand and seat assembly of the present invention which is generally referred to by reference numeral 10, mounted on a tree trunk 12. The assembly 10 includes an upper horizontal seat member 14 and a lower stand or platform 16. The seat and stand portions are formed by platform members which are vertically spaced from each other, the platform members being interconnected for mutual support thereof on a fixed object such as tree 12.

The seat portion 14 of the assembly includes an upper surface 18 upon which a hunter may be supported in seated position. The seat portion is provided with a tree engaging edge 20 which abuts against the tree 12. A pair of strap elements 22 and 24 are connected to the seat portion 14 adjacent the tree engaging edge 20 thereof through slots 26 and 28. The strap elements 22 and 24 may therefore be buckled rearwardly of the tree trunk in embracing relation thereto for support of the seat portion on the tree trunk. The seat portion is provided on its under surface 30 as more clearly seen in FIGURE 3 with a hinge member 32 by means of which the tree engaging brace member 34 may be pivotally connected to the underside of the seat portion adjacent the forward edge thereof with the rear pointed end 36 of the brace member 34 engaging the tree trunk 12 for cantilever support of the seat portion 14. Accordingly, support for the seat portion 14 is provided by the combined action of the brace member 34 and the embracing strap elements 22 and 24.

The stand portion 16 when extended wtih respect to the seat portion 14, is disposed in vertical position therebelow and includes a vertically aligned tree engaging edge 38. Connected to the edge 38 by any suitable fasteners are a pair of tree trunk gripping elements 40 whereby the stand portion 16 may prevent vertical displacement of the extended assembly on the tree trunk.

A linkage arrangement is therefore provided which interconnects the seat and stand portions in vertical spaced relation when the assembly is extended, which linkage arrangement may also accommodate the collapsed or folded condition for the assembly. A pair of rigid rod or post elements 42 are therefore provided and are pivotally connected by hinge elements 44 to the underside 30 of the seat portion 14 and top side of the stand portion 16, about horizontal axes through the laterally extending arms of the L-shaped end portions of the posts 42. The hinge elements 44 are also disposed adjacent to the rear tree engaging edges 20 and 38 of the seat and stand portion at the sides thereof. Also, in order to further support the stand portion 16 in spaced relation below the seat portion 14, a pair of steel cables 46 are provided, said cables being connected to the seat portion forwardly of the hinges 44 thereon and to the stand portion adjacent to the forward edge thereof opposite the tree engaging edge 38. The stand portion 16 as will be apparent from the drawings, extends a substantial distance beyond the seat portion 14 so as to accommodate the feet of a hunter when seated on the seat portion 14. Furthermore, the extension of the stand portion 16 beyond the seat portion 14 will also accommodate the hunter when standing.

It will be apparent from the foregoing description, that in order to collapse the asssembly 10 it will only be necessary to horizontally displace the seat portion 14 with respect to the stand portion 16 so that the forward edge 48 of the seat portion becomes aligned with the forward edge 50 on the stand portion 16. The pivoted rod elements 42 will accommodate such folding by laying down upon the upper surface of the stand portion 16 as more clearly seen in FIGURES 9 and 10 whereupon the seat portion 14 will lay against the forward half of the stand portion 16. The pivotally connected brace member 34 will then conveniently fold up between the seat and stand portion in protective relation therebetween. The strap element may then be utilized to either secure the folded assembly or strap the folded assembly to the back of the sportsman as more clearly shown in FIGURE 9.

In view of the foregoing description, operation and utility of the combined tree stand and seat of the present invention will be apparent. The assembly of the present invention is unique in that it not only provides a convenient assembly that may be easily folded for transport purposes but one that will provide both a seat and stand contributing to a more rigid and firm support on a tree trunk. Furthermore, the mounting of the extended seat and stand assembly on the tree trunk requires a minimum of effort and yet provides the firm mounting as hereinbefore indicated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A hanging assembly comprising, a seat member, a supporting top, a pair of suspension brackets having L-shaped portions, each of said portions comprising a suspension post normally upstanding from a back portion of the supporting top, and a projecting arm connected to the supporting top between its ends, and a hinge connection connected to the arm arranged to enable the post to be folded down over the supporting top and to lie against the upper surface of the supporting top; the post at its upper end being connected to said seat member, said seat member having a rearwardly located portion engaged by an element detachably supported from a fixed object whereby to then suspend the supporting top from said object in suspended relation; said element being a flexible strap adapted when detached from said fixed object to provide facilities for carrying the hanging assembly with the posts held folded against the supporting top to thereby prevent the same from unfolding, said seat member being connected to the upper ends of said posts having spaced slots adjacent a rear side thereof through which said flexible strap is anchored to the seat member, said assembly further including flexible connecting means interconnecting said seat member with the supporting top forwardly of the posts in the unfolded condition of the assembly, and means for supporting said seat member on the fixed object in substantially horizontal position.

2. The combination of claim 1 wherein said latter mentioned means includes a foldable brace member connected to the seat member and engageable with said fixed object between the supporting top and the seat member.

3. A hanging hunter's seat and stand comprising a platform, a pair of suspension brackets having L-shaped portions, each of said portions comprising a suspension post normally upstanding from a back portion of the platform and an arm projecting laterally and connected to the platform adjacent its ends, and a hinge connection between the arm and the platform arranged to enable the post to be folded down and over the platform and to then lie against the upper surface of the platform; the post at its upper end being connected to a seat member connected in vertically spaced relation to the platform by cables and having a rear portion connected to an element detachably supported from a fixed object whereby to then suspend the platform from said object in suspended relation; said element being a flexible strap adapted when detached from said fixed object to be detachably disposed about the platform, the folded posts and the seat member to thereby prevent the same from unfolding, and a foldable brace member connected to the seat member and engageable with said fixed object between the platform and the seat member for support thereof in a substantially horizontal position.

References Cited in the file of this patent

UNITED STATES PATENTS

| 1,158,173 | Carpentier | Oct. 26, 1915 |
| 1,187,078 | May | June 13, 1916 |
| 1,216,287 | Corbin | Feb. 20, 1917 |
| 1,535,978 | Baker | Apr. 28, 1925 |
| 2,711,783 | Prill | June 28, 1955 |

FOREIGN PATENTS

| 102,303 | Germany | Apr. 13, 1899 |
| 369,450 | France | Jan. 11, 1907 |